United States Patent [19]
Moore

[11] 3,946,295
[45] Mar. 23, 1976

[54] SONAR FLASHER SPEED CONTROL
[75] Inventor: John C. Moore, Tulsa, Okla.
[73] Assignee: Lowrance Electronics, Inc., Tulsa, Okla.
[22] Filed: Oct. 29, 1974
[21] Appl. No.: 518,581

[52] U.S. Cl. ............... 318/317; 318/312; 318/345
[51] Int. Cl.² ........................................ H02P 7/00
[58] Field of Search ........... 318/317, 310, 311, 312, 318/316, 440, 442, 345 B

[56] References Cited
UNITED STATES PATENTS

| | | | |
|---|---|---|---|
| 3,373,331 | 3/1968 | Dow | 318/317 X |
| 3,757,193 | 9/1973 | Inaba | 318/696 |
| 3,796,939 | 3/1974 | Raggi | 318/653 X |
| 3,845,375 | 10/1974 | Stiebel | 318/327 X |
| 3,855,511 | 12/1974 | Smith | 318/317 |

Primary Examiner—Benjamin Dobeck
Attorney, Agent, or Firm—Head & Johnson

[57] ABSTRACT

A sonar flasher motor speed control for driving a D.C. electric motor from a varying voltage source. A rotating magnet and coil system generates a first voltage pulse once each revolution of the motor. A capacitor charged through a series resistor in combination with transistor means controlled by the first voltage pulse to generate a ramp voltage once each cycle. The ramp voltage is compared with a reference voltage by means of a voltage comparator, which generates a control second voltage pulse, whenever the ramp voltage exceeds the reference voltage. Transistor amplifier means responsive to said second voltage pulse increases the motor current during the second pulse so as to maintain the speed of the motor relatively constant.

3 Claims, 1 Drawing Figure

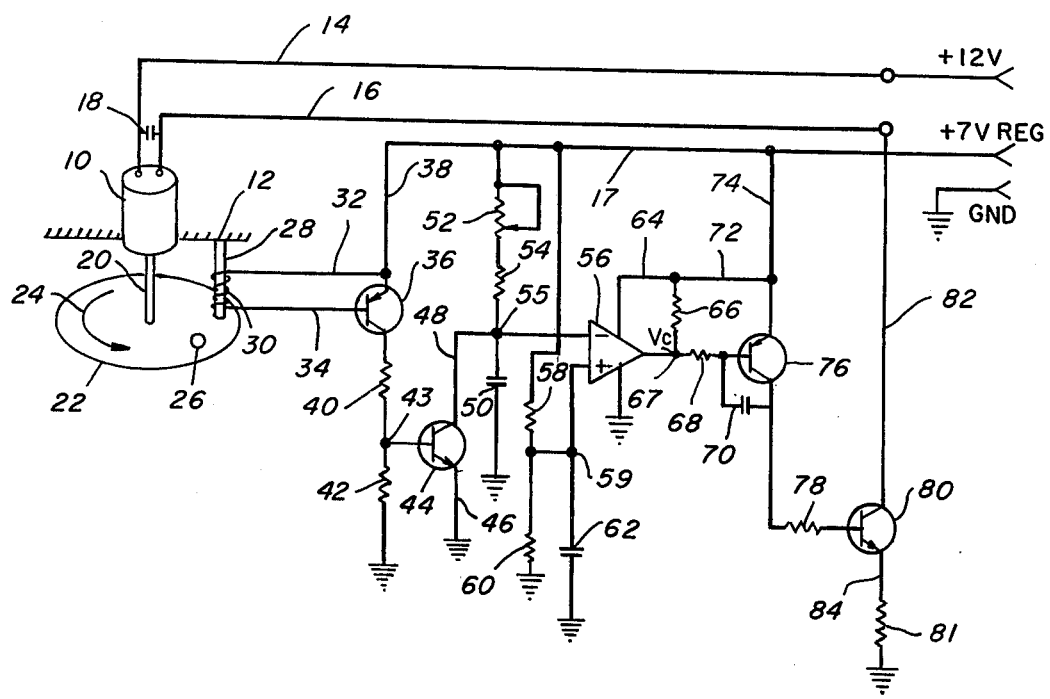

SONAR FLASHER SPEED CONTROL

BACKGROUND OF THE INVENTION

This invention lies in the field of motor control. More particularly it concerns the control of a small motor used as the timing basis for a sonar depth locator.

In the present day sonar depth locators, which are used by fishermen, the instruments are extremely portable and low power and operate generally from a twelve volt battery which may vary in voltage over a relatively wide range. The depth is usually indicated by the rotation of a D.C. motor. Once each revolution of the motor, a first voltage pulse is generated by a rotating magnet cooperating with a fixed induction coil. This first voltage pulse initiates the outgoing sonar pulse. When the sonar pulse returns after reflection at an object, a second voltage pulse is generated. There is a small neon lamp on a rotating flasher scan disc, and the first and second pulses cause flashes of the neon lamp. The angular spacing between the two flashes is a measure of the time of travel, or of the distance of travel, of the sonar pulse. Any variation in speed of the motor will change the angle between the two pulses and therefore will change the indicated distance. It becomes important, therefore, to provide a control on the motor speed so as to maintain it as nearly constant as possible irrespective of varying voltage, and conditions of load torque, friction, wear and temperatures.

It is a primary object of this invention to provide a simple electronic motor speed control that can be used with portable sonar instruments.

SUMMARY OF THE INVENTION

This and other objects are realized and the limitations of the prior art are overcome in this invention by utilizing the first electrical pulse, which is used to initiate the sonar pulse, to control a first and second transistor so as to discharge a capacitor each time the first pulse occurs. The capacitor is charged through a series adjustable resistance, from a regulated voltage so that after each discharge of the capacitor the voltage builds up as an exponential ramp voltage as a function of time.

The ramp voltage is compared continuously with a fixed reference voltage, which is provided from a regulated voltage source. Whenever the ramp voltage is greater than the reference voltage a second voltage pulse is generated by the comparator. The duration of the second pulse is a function of the speed of the motor. For example, if the motor slows down, so that the period between the pulses is lengthened, then the capacitor has a longer time to charge after each discharge so that the ramp voltage reaches a higher value of voltage. Therefore, the time, during which the ramp voltage is greater than the reference voltage, is greater and the second pulses are of greater duration.

A transistor amplifier is provided in series with the motor, and an integrator circuit is provided between the voltage comparator and the power amplifier so that during the second voltage pulse the current to the motor increases. Thus by varying the time duration of the second pulses, the speed of the motor can be adjusted. The slower the motor speed the longer the duration of the second pulse and the longer time is available for the increased current to flow through the motor, so the motor speeds up. On the other hand, when the motor speed is too fast, the second pulse is of shorter duration and therefore less current flows through the motor, causing it to slow down. This feedback from the motor shaft serves to provide a control so as to maintain a constant speed.

BRIEF DESCRIPTION OF THE DRAWINGS

These and other objects and advantages of this invention and a better understanding of the principles and details of the invention will be evident from the following description taken in conjunction with the appended drawing, which provides a schematic circuit diagram of the control system.

DESCRIPTION OF THE PREFERRED EMBODIMENT

Referring now to the drawing, there is indicated by the numeral 10 a drive motor attached to a fixed support 12. The motor is supplied with current from a 12 volt D. C. source through lead 14, and is connected through lead 16 and lead 82, going through a power transistor 80 and through lead 84 to ground. The motor 10 carries a shaft 20 with a flasher scan disc 22, rotating in the direction indicated by arrow 24. On the disc is a small magnet 26 which rotates in close proximity to an induction or pulser coil 30 supported by means 28 from a fixed support 12. The coil leads 32, 34, are connected to transistor 36 and serve to generate a positive pulse at junction 43, between resistors 40 and 42, whenever the first pulse is generated in the coil 30. An increase in positive voltage at junction 43 causes the transistor 44 to conduct, and to pass current from capacitor 50 through lead 48 to ground by lead 46.

The capacitor 50 is charged from a regulated voltage source of 7 volts through lead 17 and through resistors 52 and 54, one of which is adjustable. The first pulse generated by the magnet 26 is a very short sharp pulse so that during the time that the pulse exists the transistor 44 carried the discharge current from the capacitor 50. Thereafter, when the first voltage pulse is ended, the capacitor charges upon an exponential curve, providing a ramp of voltage at the junction 55.

A pair of resistors 58 and 60 provide a constant voltage at junction 59 across the capacitor 62. The voltage comparator 46 has two input terminals. The negative terminal is connected to the junction 55 which carries the voltage ramp function, and the positive terminal is connected to junction 59 which carries the constant reference voltage. Whenever the voltage at 55 becomes greater than the voltage at 59, that is, the voltage at the negative terminal becomes greater than the voltage at the positive terminal a negative voltage pulse is generated on the output of the voltage comparator, at the point 67. This voltage is a downgoing square wave of voltage. Its duration is a function of the rate of climb of the voltage ramp which is a function of the setting of resistor 52. It is also a function of the rate of rotation of the motor that is the length of the cycle of rotation. The longer the cycle the longer the time of charge of the capacitor and therefore the higher the voltage of the ramp. The higher the voltage of the ramp the longer the duration of the second voltage pulse.

This second voltage pulse can be termed an "error pulse" since its width varies with the speed of the motor. Its width is a measure of how much the period of rotation is slower than the time required for the ramp at point 55 to reach the reference voltage. Its width is therefore the time error of the period of rotation of the system.

Transistor 76 is connected as an integrator (Miller Integrator) with resistor 68 and capacitor 70 which integrates the error pulse at point 67. The error pulse is a negative going waveform starting at +7 volts and going to 0 volts, its time duration being the time error of the period of rotation. The integrator transistor 76 integrates this error pulse to produce a peak voltage at its collector proportional to the width of the error pulse (since the amplitude of the error pulse is constant). After the error pulse is over, the integrator voltage at the collector of transistor 76 discharges slowly through Resistor 66 and 68. The average voltage of the integrator output at collector of transistor 76 is therefore proportional to the duty cycle of the error pulse. The greater the error, the more drive voltage is applied to driver transistor 80. Driver transistor 80 is also connected as a current source through usage of 81. The integrator is fundamental to the system since it causes the system to operate with short duration error pulses. This specific embodiment could be done in several different ways such as peak detection, low pass filter with amplifier, etc. It would still be basically an integration process.

During the cycle of the motor rotation, there is a period immediately following the passage of the magnet past the coil 30 where the ramp voltage starts to build up. During this period there is no second voltage pulse. The capacitor voltage 70 is high and the motor current is average. As the ramp voltage increases it eventually becomes greater than the reference voltage at 59 and the second voltage pulse forms, causing the capacitor 70 voltage to drop, and the transistor current 80 to increase. The combination of the increasing and decreasing voltage of the capacitor 70 is a function of the speed of the motor, since the lower the speed the longer the time the capacitor 50 has to charge and the longer the duration of the second voltage pulse. This calls for higher average motor current through the transistor 80 and the motor, so as to provide the proper constant speed. The capacitor 18 across the motor leads acts as a radio frequency filter to prevent high frequency brush noise from moving into the sonar receiver, where it can be very troublesome.

The capacitor 62 may not really be necessary, since its only function is to filter the reference voltage at point 59.

While the voltages were shown as 12 volts unregulated and 7 volts regulated, they can be of any desired voltage suitable for the motor. The 7 volts regulated portion can be derived from the larger unregulated voltage source by means of appropriate Zener diodes, its exact value is not important.

The circuit component values are designed for an error pulse duration of approximately 10 percent of the period of rotation to give good stability. Under this condition if the load torque were to double (or increase 100 percent), the error pulse would approximately double, and the speed would decrease by only about 10 percent. An unregulated motor would decrease in speed much more due to a 100 percent increase in loading.

In a sonar flasher system it is essential to maintain constant motor speed to preserve accuracy. Factors which tend to change motor speed are: changes in loading due to aging of the frictional components, changing characteristics of the motor due to aging, and temperature dependent variations of the motor as well as power supply variations. A typical unregulated motor will change in speed approximately 10 percent over the temperature range of interest. Through the argument just given, by using this speed control circuit the motor speed would change approximately 1 percent. The speed is also largely independent of the +12 volt power supply (as long as there is a minimum voltage to allow motor to fulfill its ratings) since the motor is driven by a current source. The circuit does require a regulated +7 volt supply, but this supply doesn't have to be extremely well regulated since both the ramp and reference voltages are obtained from it. Therefore this supply may be obtained from a simple Zener regulator, which may be already available in the system.

As has been shown this speed control will very accurately maintain constant flasher scan disc speed against variations in power supply, loading, motor characteristics, and temperature within reasonable limits.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. In a sonar depth indicator in which the depth is indicated by the rotation of a motor and a flasher, the improvement in means to control the speed of the motor, comprising:
    a. means to generate a first voltage pulse once each revolution of the motor shaft;
    b. first capacitor means charged from a constant voltage source through an adjustable resistor, and transistor means to discharge said capacitor responsive to said first voltage pulse to generate a voltage ramp;
    c. means to continuously compare said voltage ramp with a selected constant reference voltage and to produce a second voltage pulse whenever said ramp voltage is greater than said reference voltage; and
    d. means responsive to said second voltage pulse to provide increased drive current to said motor.

2. The control circuit as in claim 1 in which said means to generate said first voltage pulse comprises a magnet rotating with said motor shaft and an induction coil in proximity to said rotating magnet.

3. A sonar flasher motor speed control system, comprising:
    a. first voltage pulse generating means comprising rotating magnet means and induction coil means in proximity to said rotating magnet, said first voltage pulse determining a rotational cycle;
    b. capacitor means and variable series resistor means to charge said capacitor means from a constant voltage source;
    c. transistor means controlled by said first voltage pulse to discharge said capacitor at each repetition of said first voltage pulse;
    d. voltage comparator means to compare the voltage across said capacitor with a selected reference voltage, and means to generate a second voltage pulse whenever said capacitor voltage is greater than said reference voltage; and e. power amplifier means to drive said motor, said amplifier means responsive to said second voltage pulse, whereby during said second voltage pulse the drive current for said motor increases and during the remainder of said cycle said motor current decreases.

* * * * *